Sept. 5, 1939.   W. M. SPENCER   2,172,018
MACHINE FOR AND METHOD OF MAKING RUBBER THREAD
Filed Jan. 30, 1937   2 Sheets-Sheet 1
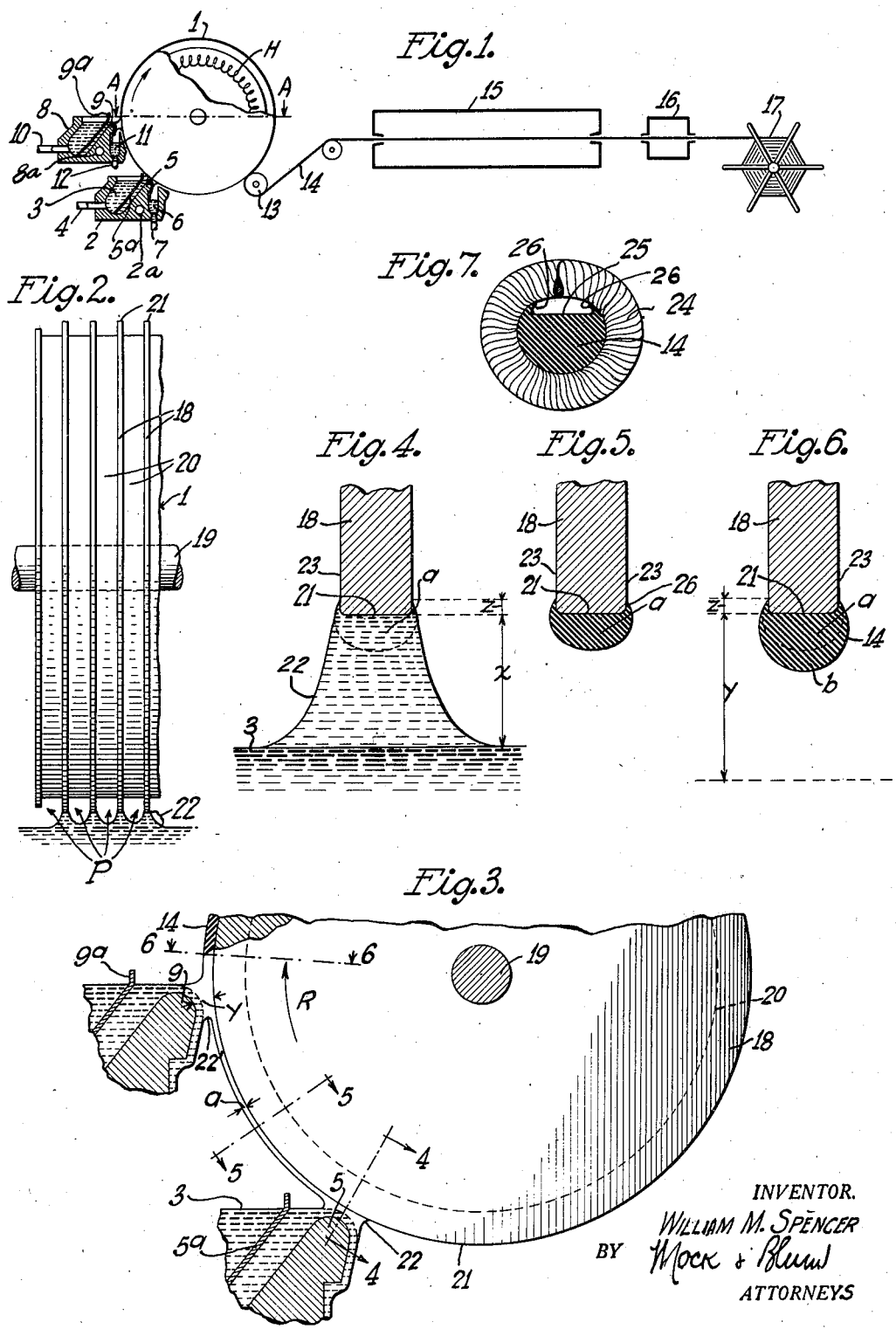

Sept. 5, 1939. W. M. SPENCER 2,172,018
MACHINE FOR AND METHOD OF MAKING RUBBER THREAD
Filed Jan. 30, 1937 2 Sheets-Sheet 2
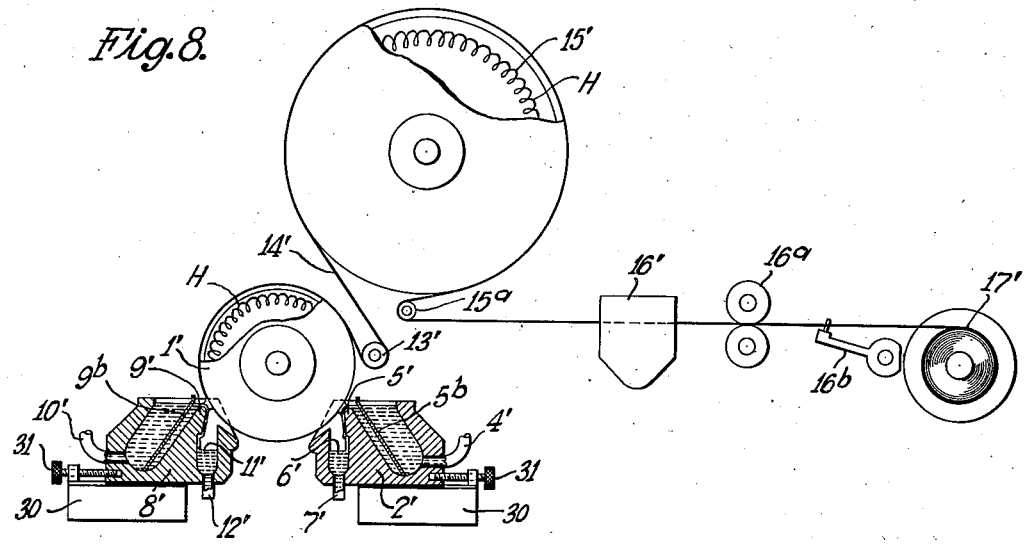
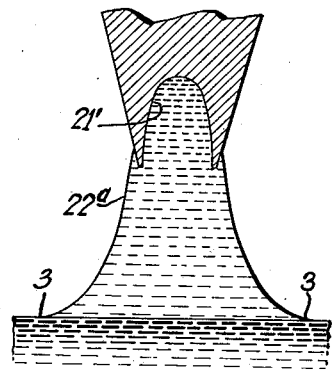
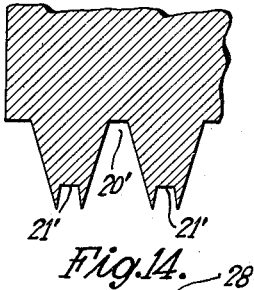
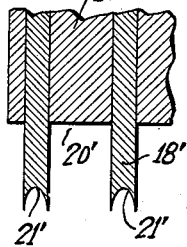
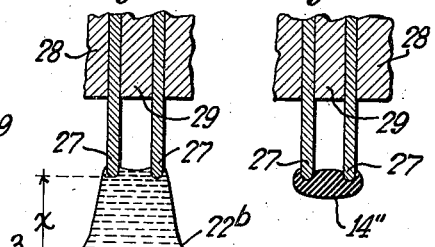
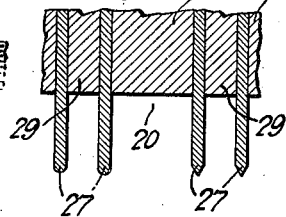
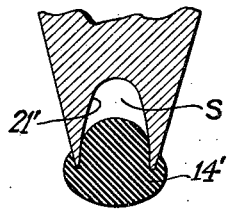
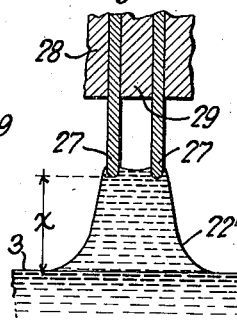
INVENTOR.
WILLIAM M. SPENCER
BY Mock & Blum
ATTORNEYS.

Patented Sept. 5, 1939

2,172,018

UNITED STATES PATENT OFFICE 2,172,018

MACHINE FOR AND METHOD OF MAKING RUBBER THREAD

William M. Spencer, Allentown, Pa., assignor, by mesne assignments, to Filatex Corporation, New York, N. Y., a corporation of New Jersey Application January 30, 1937, Serial No. 123,225

30 Claims. (Cl. 18—8)

This invention relates in general to elastic filaments and, in particular, to elastic rubber filaments adapted for use in the textile arts and to correlated improvements in a process and apparatus for making the same. This application is a continuation-in-part of my application, Serial No. 17,465, filed April 20, 1935.

The general object of the invention is to provide a cast elastic rubber filament having a uniform cross-section.

Another object of the invention is to provide a process and apparatus for casting elastic rubber filaments having a uniform configuration and weight throughout their length.

An additional object of the invention is to provide a gossamer-like rubber filament adapted for use alone or as a core for a covered thread in the fabrication of fine fabrics.

A specific object of the invention is to provide a process and apparatus for producing continuously an elastic rubber filament by picking up latex substantially solely by means of the surface tension of the latex.

Another specific object of the invention is to provide a process and apparatus for producing continuously an elastic rubber filament by picking up latex in a groove by means of the surface tension of the latex and the capillary attraction between the latex and the filament-forming member.

Other objects of the invention will in part be obvious and will in part appear hereinafter.

According to the invention, an elastic rubber filament having a uniform cross-section throughout the length is produced by moving a filament-forming member, preferably heated and having a continuous filament-collecting projection in contact with a body of latex, but spaced from the normal surface thereof, preferably while causing the latex to flow downwardly away from its point of contact with the collecting projection, and forming the latex collected on the projection into a coherent filament. It is characteristic of the present process that the latex is picked up on the projection substantially solely by the surface tension or by both the surface tension and capillary attraction and that the latex is formed into a coherent filamentary body before it is stripped from the projection.

This process is carried out by the use of an apparatus having, in combination, a movable filament-forming member having a latex collecting projection thereon and preferably means to heat the projection, means to flow latex into position to contact with the collecting projection and then substantially directly away from the point of contact with the collecting projection, and means to adjust and maintain the projection in contact with the body of latex, but spaced away from the nearest normal level of the latex during operation. The collecting projection may have, in accordance with different specific embodiments of the generic invention, a flat, convex or concave periphery when viewed in cross-section. The latex collecting projection may be formed as a continuous flat edge or as a continuous longitudinal groove, or the projection may comprise a plurality of edges, preferably a spaced pair of edges, defining a collecting groove, or the projection may comprise a plurality of spaced blades, preferably a spaced pair of blades, each projection being separated by a spacer wide enough to prevent the bridging of latex between the adjacent projections.

In the process and apparatus one may use latex, artificial dispersions or solutions of natural or synthetic rubber and such dispersions or solutions may contain vulcanizing agents, accelerators, fillers, anti-oxidants, etc.; also latex which is prevulcanized and/or heat-sensitive. The latex may be caused to gel on the collecting element by means of heat, cold, chemical coagulants, electro-deposition or by any suitable combination of these means. It is preferred to employ a heat-sensitive latex composition which gels at a temperature below 100° C. i. e. below the boiling point of water to produce a non-porous product. The expression "latex" as used herein is intended to include any of the above-mentioned dispersions or solutions.

The invention accordingly comprises the process having the several steps and the relation of one or more of such steps with respect to each of the others, the apparatus embodying features of construction, combinations and arrangement of parts adapted to effect such steps, and the article which possesses the characteristics, properties and relation of elements, all as exemplified in the following detailed disclosure and the scope of the invention will be indicated in the claims.

For a fuller understanding of the nature and objects of the invention, reference should be had to the following detailed description taken in connection with the accompanying drawings, in which:

Fig. 1 is a diagrammatical representation of one embodiment of suitable apparatus for carrying out the process of the invention;

Fig. 2 illustrates in an end view one embodiment of the filament-forming member of the invention;

Fig. 3 is a side elevation of a fragment of the filament-forming member of Fig. 2 and associated elements during the formation of the filament of the invention;

Fig. 4 is a sectional view of one embodiment of the filament-collecting element of Fig. 3 taken along the line 4—4 thereof;

Fig. 5 is a sectional view of the collecting element of Fig. 3 taken along the line 5—5 thereof;

Fig. 6 is a sectional view of the filament-collecting element of Fig. 3 taken along the line 6—6 thereof;

Fig. 7 illustrates, in a sectional view, one embodiment of the covered filament of the invention;

Fig. 8 is a diagrammatical representation of another embodiment of suitable apparatus for carrying out the process of the invention;

Fig. 9 is a sectional view of one embodiment of the filament-collecting element of the apparatus of Fig. 8, during formation of a filament;

Fig. 10 is another view in section of the collecting element of Fig. 9 showing a partly dried or solidified filament thereon;

Figs. 11 to 14 inclusive represent, in cross section, several embodiments of the filament-collecting element of the invention;

Fig. 15 is a sectional view of the filament-collecting element shown in Fig. 14 during formation of a filament therewith; and Fig. 16 illustrates a filament as formed on the collecting element shown in Fig. 15.

Referring to Fig. 1, a suitable apparatus comprises a filament-forming member 1 adapted to be moved through an endless path and having a continuous collecting projection thereon hereinafter described, and made of any suitable non-corrosive material such, for example, as stainless steel, porcelain, glass, etc. Heat may be applied to the collecting projection by reflection or directly, for example, by an electric heater H embedded in the member 1. The member 1 may be a rotatable cylindrical member as shown in Fig. 1, or it may be in the form of a movable endless belt or the like.

In proximity to the filament-forming member 1, there is positioned a latex container 2 preferably made of a non-corrosive material of one of the above mentioned types and provided with conventional means to maintain the latex 3 at a predetermined or normal level during the operation of the apparatus. For example, the normal level of the latex may be controlled by providing the container 2 with a weir 5 and by flowing latex through a conduit 4 into the container at a specified rate so as to cause it to pass over a weir 5 in the form of a layer having a constant thickness. A spacer plate 5a, the bottom portion of which is forked or perforated, is mounted in the container and causes the latex to flow in an annular path forming a relatively wide horizontal apex at the peak of the weir 5. The latex which passes over the weir 5 into a chamber 6 may be conducted away through a conduit 7.

Additional latex containers of like or similar construction may be employed in combination with the member 1, such as latex container 8 which may be positioned at or below the horizontal center line A—A of the member 1. The latex container 8 may comprise a spacer plate 9a and a weir 9 positioned therein and suitable means for flowing latex through a conduit 10 at a predetermined rate in the direction of and over the weir in the form of a layer having a constant thickness. After passing over the weir, the latex flows into a chamber 11 from which it may be conveyed back through conduit 12 to a suitable tank to be mixed with fresh latex. The containers may be cooled in any suitable manner as by circulating a cooling fluid through appropriate jackets or channels such, for example, as 2a and 8a in containers 2 and 8 respectively, which may be provided in and/or around the containers. The latex containers and/or the weirs therein are adjustably mounted with respect to the filament-forming member. For example, as shown in Fig. 8, the containers 2' may slide upon a support 30 and be moved into proper position by means of a threaded screw 31.

The apparatus also comprises means such as a roller 13, for stripping the coherent filaments 14 from the member 1 and guiding the same through means for further drying and/or vulcanizing the filaments, such as a chamber 15 which is adapted to be heated in a suitable manner. The filaments 14 may be passed through a suitable dusting chamber 16, wherein they are dusted with talc or the like. Thereafter, the filament may be wound upon a swift 17 or passed directly to a suitable thread covering machine.

Referring to Fig. 8, another embodiment of the apparatus of the invention is shown which comprises a filament-forming member 1' having a latex-collecting projection 21' thereon as hereinafter described. The member 1' is adapted to be heated in any suitable manner as by an electric heater H, a combustible gas or a heated fluid. A suitable number of latex containers such as 2' and 8' may be positioned below the horizontal center line of the member 1'. The latex containers 2' and 8' which may be similar in construction to containers 2 and 8, may have associated therewith spacer plates 5b and 9b, weirs 5' and 9', latex inlet conduits 4' and 10', receiving chambers 6' and 11' and outlet conduits 7' and 12' respectively.

The apparatus further comprises a roller 13' for stripping the filaments 14' from the forming member 1' and guiding the same to a grooved roller 15' which may be heated by suitable means such as an electric heating coil H' for further drying, combining and/or vulcanizing the filaments 14'. The filaments 14' may be stripped from the roller 15' by roller 15a from which they may be passed through a dusting chamber 16', nip rollers 16a, a guiding comb 16b and thence wound upon a reel 17'.

In the production of filaments of very fine sizes ranging, for example, from .002 to .008 inch in average diameter, it is preferred to employ a filament-forming member having a collecting projection which consists of a continuous edge such, for example, as a member of the type shown in Fig. 2. In this embodiment, the member 1 may comprise a plurality of spaced collecting edges 21 defined by non-corrosive metal discs 18 mounted on a shaft 19 and separated by means of discs 20 which are smaller in diameter, but greater in width than the discs 18. The discs 20 are formed preferably of a heat-conducting material such as metal, mica or the like and have smooth peripheral surfaces which serve to heat the pockets P by radiation. The latex-collecting projection 21 of each of the discs 18 may be flat, convex or concave in cross-section in accordance with the specific embodiments of the invention, it being highly desirable, however, that the collecting projections 21 of the several discs 18 lie in the same plane and preferably the discs 18 have a common axis and identical radii.

Alternatively, the filament-forming member 1 of this or other embodiments herein shown may be made by machining a stainless steel metal cylinder so as to form a plurality of collecting projections spaced parallel and separated by spaces or grooves of such depth and width that the latex does not collect therein. Without limiting the invention to any specific dimensions, it has been found that filaments which are finer and more uniform in cross-section are obtained when the width of the collecting projection lies between 0.001 and 0.007 inch.

In the production of filaments having a diameter of about 0.008 inch or more, it is preferred to employ a filament-forming member having collecting projections of the grooved type such, for example, as those shown in Figs. 9 to 13 inclusive. Such a collecting member preferably comprises a cylinder having a plurality of collecting grooves 21' and intermediate separating grooves 20', the latter of which are wider and deeper than the collecting grooves. Without limiting the invention to any specific figures, each groove 21' may have a depth of 0.009 inch and a width of 0.007 inch. Both the depth and the width of each groove 20' may be about .06 inch. As above indicated, the collecting and separating grooves may be formed integral with the cylinder as by machining, knurling, etching, etc. as shown in Fig. 11. Alternatively, the forming member may comprise a series of discs 18' each having a grooved periphery and being spaced apart by separating discs 20a as shown in Fig. 12. Alternatively, the collecting grooves may be defined by a pair of contiguous discs 18a and 18b as shown in Fig. 13, each pair being separated by a spacer 20a. The cross-sectional contour of the collecting grooves 21' may be rounded, V-shaped, poly-sided, etc.

In the production of flat filaments or ribbons having greater width than thickness, it is preferred to employ the type of collecting projection illustrated in Figs. 14 to 16 inclusive. The filament-forming projection of this type preferably comprises pairs of spaced parallel blades 27, the respective pairs being separated by a relatively wide spacer 28. The individual blades of each pair are separated by a spacer 29 which is narrower than spacer 28, the width of which determines the width of the flat filament formed thereon. If a wider filament is desired, the projection may comprise three or more blades in a group, each blade in the group being separated by a relatively narrow spacer and each group, i. e. each projection, being separated from the next projection by a wider spacer 28.

With any of the embodiments of the apparatus shown or described herein, the latex container may be cooled by any suitable means known in the art to prevent the gelling and coagulation of the latex. The latex may be circulated through the apparatus by the use of any suitable pump or by gravity and the flow of the latex may be concurrent or countercurrent to the direction of travel of the collecting projection.

In starting the operation of the various embodiments of the apparatus, the filament-forming member is heated and set in motion while the latex container or containers are adjusted so that the surface or surfaces of the latex contact and wet the several moving collecting projections. The exposed surface or surfaces of the latex in the container or containers are then gradually moved away from the filament-forming member until the collecting projections are spaced away from the nearest normal surface of the latex. The surface tension of the latex causes the latex to cling to the collecting projections, thus forming a bridge of latex between the surface of the latex and the collecting projection, as shown in Fig. 3.

Referring to Fig. 3 and 4, the distance "x" between the first collecting projection and the nearest normal surface of the latex at the first point of contact is preferably maintained at 0.25 to 3.0 mm. This distance, however, may be varied depending on several conditions such, for example, as the particular latex employed, the viscosity and surface tension of the same, the temperature and relative speed of the filament-forming member, the width of the collecting-projection, etc. The distance "y" between the collecting projection and the normal surface of the latex at the second collection point should be approximately equal to the distance "x" between these elements at the first collection point plus the thickness "a" of the filament formed at the first collection point. The layer of latex flowing over the weir may be of any suitable depth such, for example, as a depth of from 0.03 to 0.06 inch wherein the collecting projections pass over a body of latex 3 in the direction of the arrow R. The surface tension of the latex is sufficient to form the bridge 22 between the filament collecting projections and the surface 3 of the latex. The bridge 22 is continuously maintained during the movement of the filament-forming member so that the latex moves into contact with or collects on the collecting projection solely by the surface tension of the latex. The distance "z" (Figs. 4 and 6) is the height which the latex reaches on the side of the blades and it is believed that limitation of this distance is a function of the viscosity of the latex and heat radiating from the collecting member, more particularly, of the temperature of the pocket P shown, for example, in Fig. 2. This pocket is defined by the adjacent collecting discs 18, the spacer discs 20 and the surface of the latex.

In the now preferred process, in which the latex is gelled by heating it, the heat emanating from the discs 18 and from the pocket P tends to repel the latex so that it does not climb to an appreciable height on the sides, but forms a deposit which has a substantially uniform cross-section and a nebligible but uniform upper edge portion 26. If the latex is to be gelled by means other than heat, for example, by refrigerating the collecting projection, distance "x" may be increased so as to decrease the height "z" to which the latex tends to rise on the side of the projection.

Figs. 4 to 6 inclusive, which illustrate one embodiment of the individual edge type filament-collecting projection of the invention, are drawn substantially to scale, from which it is clear that the major quantity of the latex is collected on the peripheral surface 21 of the disc or blade 18 and a minor and insignificant quantity on the side surfaces 23. The conditions of operation are preferably such that the height "z" to which the latex rises on the sides 23 is not more than one fifth of the distance "x" between the end surface 21 and the normal level of the latex in the container 2 and preferably not more than one-tenth of the distance "x".

The filament formed at the first collection point is indicated by the character "a" of Fig. 5. If a larger filament is desired, a second pick-up point may be provided as shown in Fig. 3, wherein the filament-forming member collects a second coating of latex from the layer flowing over the weir 9 in the same manner as described in connection with the first pick-up point. A bridge 22' is formed between the filament "a" and the flowing latex layer so that the proportion "b" (shown in Fig. 6) of the complete filament 14 is also accumulated by means of surface tension alone. In carrying out the process of the invention, it is obvious that one or more pick-up points may be employed to provide a filament of the desired thickness. By picking up the latex two or more times at spaced intervals, the drying of the latex and the stripping of the filament from the projection is facilitated.

In the formation of filaments by the use of the grooved collecting projections such, for example, as those illustrated in Figs 9 and 13 inclusive, the general operating procedure is the same as that hereinbefore described. A cross-section of a grooved collecting projection during operation is shown in Fig. 9 wherein a bridge 22ª of latex is formed and maintained by surface tension between the groove 21' and the surface 3 of the latex. The latex enters and substantially fills the groove 21' by means of capillary attraction. It may be thus seen that two forces come into play during the collection of latex in a grooved projection, i. e. surface tension is that force which maintains the bridge of latex between the collecting projection and the surface of the latex, and capillary attraction is that force which causes the latex to enter the groove. The distance to which the latex rises on the outer surface of the collecting projections is likewise impeded and/or controlled as aforementioned by the heat emanating from the intermediate separating grooves 20'.

Upon further movement of the projection the latex bridge 22ª breaks and the heat of the forming member causes the collected latex to gel and form a coherent filament. It is preferred to dry the latex only partially while on the projection, as the partially dried filament may be stripped from the projection more readily than a completely dried filament. In some cases the shrinkage of the latex gel on drying causes the filament to draw away from the groove 21' and leave a small space S therebetween, as shown in Fig. 10. It is preferred to complete the drying after stripping the filament from the projection, in order that the contraction of the gel may be more symmetrical. Figs. 9 and 10 are drawn substantially to scale but not on the same scale as the other figures of the drawings.

In the formation of flat filaments as shown in Figs. 14 to 16 inclusive, the latex is collected in substantially the same manner as that described with respect to the collecting members of Figs. 2 and 6 inclusive, the bridge 22ᵇ being formed as shown in Fig. 15. As shown in Fig. 16, the flat filament 14" is formed on and between the edges of the parallel blades 27. The distance between the blades 27 in the group must be such as to assure bridging of the latex between the blades. This distance may vary from zero to about .065 inch depending, of course, on the viscosity of the latex, heat of the blades 27, etc. While in Fig. 16 the projection comprises only a pair of blades, it is within the purview of the invention to employ collecting projections comprising any suitable number of blades depending upon the width of the filament to be formed.

While still on the projection, the collected latex is formed into a coherent filament of rubber, preferably by heating the latex until it forms a gel. The gelled latex may be partially or completely dried while on the projection and thereafter stripped therefrom by suitable means such as a roller 13. The coherent filament may be further dried, combined with another filament, dusted and vulcanized in any suitable manner.

The finished filament may be covered with a suitable textile yarn by winding or by any other suitable method. There is shown in Fig. 7 a cross-section of a rubber filament 14 formed by the individual edge process of Fig. 4, for example, having a textile yarn 24 helically wound thereover. The rubber filament 14 is characterized by having a non-circular cross-section but a substantially cylindrical surface except on the face 25 where the latex contacted the edge of the collecting disc 18. This face lies above the longitudinal axis of the filament and has a contour substantially identical with that of the end face 21 of the disc and is bounded by spaced longitudinal fins 26. The face 25 and the fins 26 are somewhat modified by the drying and vulcanizing processes, these operations tending to round off the edges of the fins 26. During the covering operation, the fins 26 are compressed and/or flattened against the body of the filament. If sufficiently large, the flattened fins may serve to prevent displacement of the covering, as disclosed and claimed in my co-pending application, Serial No. 99,342, filed September 4, 1936.

The filaments formed according to the present invention are substantially uniform throughout their length with respect to shape, size and general physical characteristics. This uniformity is due to the method of collection which is effected solely by the surface tension or by the conjoint action of surface tension and capillary attraction of the latex. The size of the rubber filament produced is dependent interalia upon the number of layers of latex collected, the viscosity of the latex and the dimensions and operating spacing of the collecting projections. Hence, filaments varying from the exceedingly fine gossamer-like sizes to the relatively larger sizes, as well as filaments of various shapes, may be produced according to this invention.

The threads which are thus formed have sufficient cross-section or body so that said rubber threads can be covered directly with one or more helical layers of yarn, so as to make thread which can be used directly in knitting or weaving fabrics. Said covered yarn may be sufficiently fine so that it can be used directly in needles of knitting machines.

The heavy or power thread may be produced directly by employing a filament forming member having a projection of a size corresponding to the size of the thread desired. A stratified power thread may also be produced by combining two or more of the fine filaments of the invention. This may be conveniently done by leading two or more threads from the filament-forming member in Fig. 8 to a single groove on the roller 15'. A grooved cooperating roller (not shown) may be provided to cooperate with the grooves on the roller 15' to compress and shape the several filaments into a coherent body.

Due to its improved physical properties and structure, the flat elastic filament produced in accordance with the invention is admirably suited, inter alia, for use in making golf balls by winding the filament on a suitable core in the usual manner. The novel filament of the invention permits a greatly increased winding tension, thereby producing a golf ball having an unusually low compression value of less than 9%.

While the drawings illustrate a filament-forming member having a generally cylindrical shape, it is within the broad purview of this invention to employ any suitable endless member having one or more continuous collecting projections on one or more of its surfaces. In lieu of a cylindrical or belt-like device, a rotatable disc mounted at any suitable angle and having collecting projections on one or both faces may be employed, or a hollow rotatable member having collecting projections on its outer and/or inner surfaces may likewise serve to complete the ends of the invention. The collecting projections may also comprise one or more endless wires or bands having any suitable cross-sectional shape which preferably contact a guide roller or the like at the latex pick-up point or points. Each wire or band may be shaped to present a collecting surface of any of the types hereinbefore described. The latex containers may be suitably designed to cooperate with the particular filament-forming member used.

Since certain changes may be made in carrying out the above process and in the product, and modifications effected in the apparatus for practicing the principle thereof, without departing from the scope of the invention, it is intended that all matter contained in the above description or shown in the accompanying drawings shall be interpreted as illustrative and not in a limiting sense. While I have shown a preferred method, the claims for the article of manufacture are not to be limited to any particular method of making said article of manufacture.

Having described my invention, what I claim as new and desire to secure by Letters Patent is:

1. In a process of producing a filament, the step comprising continuously collecting latex by means of surface tension and capillary attraction in the groove of a continuous collecting projection having a longitudinal groove therein, said projection moving adjacent to, but spaced from, a surface of latex.

2. In a process of producing a rubber filament, the step which comprises collecting latex by means of its surface tension on the edge of an endless heated element moving adjacent to, but spaced from, a surface of latex.

3. A process for the continuous production of rubber filaments, which comprises moving a heated filament-forming member having one or more continuous collecting edges thereon so that the edges are adjacent to, but spaced from, the nearest normal surface of a body of latex, the surface tension of the latex maintaining a continuous bridge of the gap between each edge and the latex surface.

4. A process for the continuous production of rubber filaments, which comprises moving a heated filament-forming member having a continous collecting projection having a longitudinal groove therein so that the projection is spaced from the nearest normal surface of a body of latex while continuously collecting latex in the groove from said body by surface tension and capillary attraction.

5. A process for the continuous production of flat rubber filaments, which comprises moving a heated filament-forming member having a plurality of spaced blades thereon with the blades spaced from the nearest normal surface of a body of latex and continuously collecting a latex form on the plurality of blades by surface tension.

6. In a process for producing a filament, the steps comprising moving a filament-forming member having a continuous collecting projection thereon and flowing latex in a curvilinear path which at one point is in contact with said projection.

7. A process for producing a filament, comprising flowing latex in a non-rectilinear path having a convex contour adjacent a continuous collecting element on a heated and moving filament-forming member, and collecting latex on said element at the convex contour.

8. In an apparatus for forming filaments, the combination of a movable filament-forming member having a continuous collecting element and means for flowing latex in a curvilinear path which at one point is adjacent to said collecting element.

9. In an apparatus for forming rubber filaments, the combination of a rotatable member having at least one continuous collecting projection having a longitudinal groove therein and means to cause rubber-containing liquid to flow into position to contact with said grooved projection and then substantially directly away therefrom whereby rubber is adapted to be collected in the grooves.

10. In an apparatus for forming elastic rubber filaments, the combination of a rotatable member having a continuous projection comprising a plurality of spaced blades and means to cause latex to flow into position to contact with and then downwardly away from said blades, whereby latex is adapted to be collected on the full width of the projection.

11. An apparatus for forming elastic rubber filaments, comprising, in combination, a movable filament-forming member having a longitudinally grooved continuous projection thereon, a container having means therein to cause a layer of latex to flow in an annular path forming a relatively wide horizontal apex, means for heating the grooved projection and means for moving the member while in contact with the latex at the apex of the flowing layer so that latex is collected in the groove.

12. An apparatus for forming elastic rubber filaments, comprising, in combination, a movable filament-forming member having collecting grooves thereon separated by intermediate grooves which are wider and deeper than said collecting grooves, means for heating said member, means for moving said member relative to a body of latex whose top has a predetermined normal level with the edges of said collecting grooves spaced away from, but sufficiently close to, said normal level so that the surface tension and capillary attraction of the latex will cause it to enter said collecting grooves.

13. An apparatus for forming elastic rubber filaments comprising, in combination, a weir over which a body of latex may be caused to flow, a movable filament-forming member positioned to pick up latex from the body which flows over said weir and adjustable means for varying the distance between said weir and said filament-forming member.

14. In an apparatus for forming elastic rubber filaments, the combination of a movable filament-forming member having a continuous collecting projection thereon comprising a plurality of spaced cooperative blades, means for moving said member and means for maintaining a layer of latex in such proximity to, but spaced from, the edges of said blades which are in such proximity to each other, that a latex form is collected on two or more of said blades by surface tension alone.

15. In an apparatus for forming elastic rubber filaments, a filament-forming member having a continuous collecting projection comprising a pair of cooperative parallel blades having spaced edges in such proximity to each other as to pick up rubber therebetween from a rubber-containing liquid.

16. In an apparatus for forming elastic rubber filaments, a filament forming member having a continuous collecting projection comprising a plurality of cooperative spaced blades in such proximity to each other as to pick up rubber therebetween from a rubber-containing liquid.

17. In an apparatus for forming elastic rubber bodies, a filament-forming member comprising a cylindrical member having on its surface one or more endless collecting grooves separated by intermediate grooves which are wider and deeper than said collecting grooves.

18. A process for producing a rubber filament comprising moving a filament-forming member having a collecting projection provided with a groove therein, flowing a rubber-containing liquid in a curvi-linear path which at one point is adjacent to said projection and diverting liquid at said point onto said projection.

19. An apparatus for forming rubber filaments comprising a movable member having a collecting projection formed thereon, a container for a rubber-containing liquid, and means for relatively moving said member and container to bring said projection into contact with the liquid in said container.

20. A process for producing a rubber filament comprising moving a filament-forming member, flowing a rubber-containing liquid into position to contact with said member, and then flowing the liquid away from said point of contact and at an angle of less than 180° to the said liquid flowing into position to contact with the member.

21. An apparatus for forming filaments comprising a movable filament-forming member, means for positioning a body of rubber-containing liquid in position to deposit rubber upon said filament-forming member, a second means for positioning a body of rubber-containing liquid in position to deposit rubber upon the rubber previously deposited upon said filament-forming member, and means for stripping the filament so formed from said filament-forming member.

22. A process for producing an elastic rubber thread, comprising collecting rubber latex on a continuously moving projection, heating the projection to coagulate the latex on said projection to form a coherent rubber deposit, collecting latex on said rubber deposit, while heat is being applied to said projection to form a second rubber deposit which joins with said first formed rubber deposit, and continuously stripping said combined deposits from said projection in the form of a thread.

23. The process of producing a filament comprising moving a collecting element with a surface thereof adjacent to, but spaced from, a surface of a body of latex, interposing a bridge of latex between the collecting element surface and the body of latex, and maintaining the bridge by the surface tension of the latex to collect latex on said collecting element surface.

24. In an apparatus for forming filaments, the combination of a movable filament-forming member having a continuous collecting element, means to move said element, and means for maintaining a body of rubber-containing liquid with a surface thereof adjacent to but so spaced from said element as to enable a bridge of rubber-containing liquid to be maintained between said surface and said element through the action of the surface tension of the liquid, whereby liquid may be continuously collected on said element.

25. An apparatus for forming filaments comprising a continuous flat collecting edge, means for moving said edge and means for maintaining a body of rubber-containing liquid with a surface thereof adjacent to but so spaced from said edge as to enable a bridge of rubber-containing liquid to be maintained between said surface and said edge through the action of the surface tension of the liquid, whereby liquid may be continuously collected on said edge.

26. An apparatus for forming filaments comprising a continuous grooved collecting element, means for moving said element, and means for maintaining a body of rubber-containing liquid with a surface thereof adjacent to but so spaced from said element as to enable a bridge of rubber-containing liquid to be maintained between said surface and said element through the action of the surface tension of the liquid, whereby liquid may be continuously collected in the groove of said element.

27. The process of producing a filament comprising moving a collecting element with a surface thereof adjacent to, but spaced from, a surface of a body of fluid latex, interposing a bridge of latex between the collecting element surface and the body of latex, maintaining the bridge by the surface tension of the latex to collect latex on said collecting element surface, gelling the collected latex sufficiently to form a coherent body, further moving the collecting element with the coherent latex body thereon adjacent to, but spaced from, a surface of a body of fluid latex, interposing a bridge of latex between the latex on the collecting element surface and the body of fluid latex, and maintaining the latter bridge by the surface tension of the latex to collect additional latex on the latex on the collecting element surface.

28. The process of producing a filament comprising moving a collecting element with a surface thereof adjacent to, but spaced from, a surface of a body of fluid latex, interposing a bridge of latex between the collecting element surface and the body of latex, maintaining the bridge by the surface tension of the latex to collect latex on said collecting element surface, applying heat to the collected latex to coagulate the same, further moving the collecting element with the latex thereon adjacent to, but spaced from a surface of a body of fluid latex, interposing a bridge of latex between the latex on the collecting element surface and the body of latex, and maintaining the latter bridge by the surface tension of the latex to collect additional latex on the latex carried by the collecting element surface.

29. The process of producing a filament comprising moving a grooved collecting element with the groove thereof adjacent to, but spaced from, a surface of a body of fluid latex, interposing a bridge of latex between the collecting element groove and the body of latex, maintaining the bridge by the surface tension of the latex to collect latex in said groove, applying heat to the collected latex to coagulate the same, further moving the collecting element with the latex thereon adjacent to, but spaced from a surface of a body of fluid latex, interposing a bridge of latex between the latex on the collecting element and the body of latex, and maintaining the latter bridge by the surface tension of the latex to collect latex on the latex carried by the collecting element.

30. The process of producing a filament comprising moving a grooved collecting element with the groove thereof adjacent to, but spaced from, a surface of a body of fluid latex, interposing a bridge of latex between the collecting element groove and the body of latex, maintaining the bridge by the surface tension of the latex to collect latex in said groove, gelling the collected latex sufficiently to form a coherent body, thickening and rounding out the collected latex deposit by further moving the collecting element with the coherent latex body thereon adjacent to, but spaced from, a surface of a body of fluid latex, interposing a bridge of latex between the latex on the collecting element and the body of fluid latex, and maintaining the bridge by the surface tension of the latex.

WILLIAM M. SPENCER.